(12) United States Patent
Vinberg et al.

(10) Patent No.: US 6,327,550 B1
(45) Date of Patent: Dec. 4, 2001

(54) METHOD AND APPARATUS FOR SYSTEM STATE MONITORING USING PATTERN RECOGNITION AND NEURAL NETWORKS

(75) Inventors: Anders Vinberg, Islandia, NY (US); Ronald J. Cass, Beachwood, OH (US); David E. Huddleston, Beachwood, OH (US); John D. Pao, Beachwood, OH (US); Phil K. Barthram; Christopher W. Bayer, both of Winnersh Triangle (GB)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/799,142

(22) Filed: Mar. 5, 2001

Related U.S. Application Data

(63) Continuation of application No. 09/084,620, filed on May 26, 1998.

(51) Int. Cl.[7] .............................. G06F 11/30; G06F 15/00
(52) U.S. Cl. ........................ 702/186; 702/183; 709/224; 700/48

(56) References Cited

U.S. PATENT DOCUMENTS

| | | |
|---|---|---|
| 4,563,746 | 1/1986 | Yoshida et al. ................. 702/185 |
| 4,642,782 | 2/1987 | Kemper et al. .................. 706/53 |
| 4,754,410 | 6/1988 | Leech et al. ..................... 706/45 |
| 5,052,043 | 9/1991 | Gaborski .......................... 382/157 |
| 5,142,612 | 8/1992 | Skeirik ............................ 706/23 |
| 5,197,114 | 3/1993 | Smeirik ........................... 706/23 |
| 5,311,421 | 5/1994 | Nomura et al. ................... 700/37 |
| 5,402,521 * | 3/1995 | Niida et al. ...................... 706/20 |
| 5,440,723 * | 8/1995 | Arnold et al. .................... 714/2 |
| 5,487,148 * | 1/1996 | Komori et al. ................... 714/4 |
| 5,557,547 * | 9/1996 | Phaal ............................... 702/127 |
| 5,659,667 | 8/1997 | Buescher et al. ................. 706/23 |
| 5,729,472 * | 3/1998 | Seiffert et al. ................... 702/188 |

OTHER PUBLICATIONS

A Guide to Expert Systems, Donald A. Waterman, 1986, pp. 249–252.

"Neural Networks for Control–An Overview," Tariq Samad, 1991, pp. 1939–1946.

"Neural Networks for Fault Diagnosis Based on Model Errors or Data Reconciliation," Advances in Instrumentation and Control, vol. 48, No. 3 (1993) PP. 1701–1709.

"Use of Neural Networks in Necular Power Plants," Robert E. Uhrig, Proceedings of the 7th Power Plant Dynamics Control and Testing Symposium, May 15–17, 1989.

"Optimizing Combustion with Integrated Neural Networks and AI Technologies," William H. Verduin, Control Engineering, Jul. 1992, pp. 38–40.

"Self–Organizing Control Using Fuzzy Neural Networks," T. Yamaguchi, T. Takagi, and T. Mita, International Journal of Control, vol. 56, No. 2, pp. 415–439, Aug., 1992.

"Integrated Approach Using Neural Network for Fault Detection and Diagnosis," Y. Yamamoto, 1990 International Joint Conference on Neural Networks, pp. I–317–I–326.

"Robust Control of Non–Unear Systems Using Pattern Recognition," Dejan J. Sobajic, Yoh–Han Pao, Dennis T. Lee, 1989.

* cited by examiner

Primary Examiner—Marc S. Hoff
Assistant Examiner—Manuel L. Barbee
(74) Attorney, Agent, or Firm—Thomas E. O'Connor, Jr.; Robert R. Lech; Calfee, Halter & Griswold LLP

(57) ABSTRACT

Pattern recognition of common modes by neural networks and other techniques are used to monitor and determine or predict the state of networks, computers, software systems, logical networks or other components of an information system, to report actual or predicted states, and to report other state characteristics.

25 Claims, 7 Drawing Sheets

METHOD AND APPARATUS FOR SYSTEM STATE MONITORING USING PATTERN RECOGNITION AND NEURAL NETWORKS

This application is a continuation of Ser. No. 09/084,620 filed May 26, 1998.

CROSS-REFERENCE TO RELATED APPLICATIONS, IF ANY

None.

STATEMENT AS TO RIGHTS TO INVENTIONS MADE UNDER FEDERALLY SPONSORED RESEARCH AND DEVELOPMENT, IF ANY

BACKGROUND OF INVENTION

A. Field of Invention.

The present invention is in the field of software-implemented systems and articles of manufacture to monitor and determine or predict the state of networks, computers, software systems, logical networks or other components of an information system.

B. Related Background Art

Prior art systems and network management systems monitor the state of system components by monitoring various metrics and comparing them with predefined threshold values. Data samples are typically gathered by monitoring agents, by probes inserted in software systems and by other management tools. The samples may be gathered on a regular basis, by intermittent polling over the network, or on an event basis, triggered by signals sent by an agent, probe or manager. In practice, an agent may monitor a thousand metrics for a single computer system. A state manager may monitor several logical systems operating within several networked computer systems and network components. A state manager typically determines the state of a monitored system by comparing the metrics with predefined threshold values. The determination may be based on logical combinations of several such comparisons. The state may be determined in response to events sent by an agent. The determination may be based on correlating events and conditions across several system components or over time. The aggregate of the rules that define how the information is collected and the state determination is made is generally referred to as a "policy". Such state managers are referred to as "policy-based state managers."

Such systems have the theoretical potential to work but they have distinct practical disadvantages and limitations. Deciding on a set of meaningful threshold values for hundreds or thousands of metrics is complex. Deciding on specific threshold values for different types of systems is even more difficult. Computer systems come in many different hardware and software configurations and have many different usage profiles. For example, a database server may have a very different load profile from a web server and their respective suitable threshold values for raising alarms may be very different. Selecting logical conditions for correlating several metrics, perhaps correlating over time, further increases the decisional complexity. defining a policy that gives early warning of impending problems, rather than giving redundant information that a system is already down, is also very difficult.

Thus, policy-based state managers in the prior art may work well if properly configured. However, when used in complex, networked systems, they are very difficult to configure so as to give meaningful indications.

SUMMARY OF INVENTION

The present invention is a software-implemented, state monitoring system. Instead of using a fixed set of threshold values and comparison rules, each manually and separately defined by a policy author, it uses artificial intelligence technology to do pattern recognition and then to decide the conditions that raise alarms, in order to monitor and to determine or predict the state of a networked system or any of its components or subsystems. A preferred embodiment of this invention uses neural network techniques, a type of artificial intelligence, to do the pattern recognition.

In typical usage, the inventive system is educated by watching the monitored system over a period during which the monitored system is exposed to common load patterns. This is the learning phase of the operation of the inventive system. Conventional agents, probes and managers collect data over a period such as a few weeks, depending on the load patterns on the monitored system. Once enough data has been collected, the inventive system analyses the data using a neural network or other technique capable of performing pattern recognition, to identify "common modes." Common modes are clusters of commonly occurring state vectors within n-dimensional space defined by n metrics collected. Pattern recognition techniques and pattern recognition by neural networks are well known technologies in the art.

Once educated during an initial learning phase, the invention enters its monitoring phase in which it continually monitors the system by comparing state vectors reported by the agents, probes and managers with the recognized common modes previously identified by pattern recognition in the learning period. When a state vector appears that does not lie in one of the common modes recognized during the tutoring phase, the invention raises an alarm, reporting that the monitored system or a component or subsystem has entered an unusual or unprecedented state.

Incremental Learning.

The inventive system continuously updates its degree of learning during its monitoring phase. A human manager or automated management tool studies the alarm message, and if necessary inspects the managed system in more detail, and then determines what should be done. If it is determined that the alarm message referred to a common situation that should be included among the common modes for future monitoring, the invention can add this data point to the set of data used for tutoring. If certain techniques such as neural networks are used for pattern recognition, the inventive system is able incrementally to learn a new state and add the new state to the set of common modes. Complete retraining of the system, which would require extensive computer time and resources, is not required. Other pattern recognition techniques may require that data point be added to the tutorial database which, as supplemented by the new data, must be re-analyzed to determine a new common mode.

As defined above, the invention does not initially know if a state is "good" or "bad". It only knows that a state falls outside the common modes that have previously occurred. Indeed, it does not know if the recognized common modes are "good" or "bad".

State Labellinz: Manual or Automatic.

The invention can be extended to incorporate state labeling, the marking or labeling of a particular state: a human manager can manually label selected state vectors at selected time points as being good or bad. The invention can also do automatic state labeling which consists of correlating state vectors with metrics or events reported by management tools. With automatic state labeling, the invention can select more significant information: it can report that the monitored system or a component of the system, is in a good mode, a bad mode, or an unprecedented state. The inventive system may be further enriched by specifying degrees of goodness or badness of common modes.

Transition Monitoring.

In addition to identifying common modes, the invention can also identify common transitions between such modes. This is done in a straightforward way by "lagging" the state vector or recognized mode, incorporating the predecessor value in the data set being analyzed, and doing the same kind of pattern recognition on combinations of modes and predecessor modes.

Having identified transitions, the system collects historical data recording the probabilities of transition between and among modes. This analysis will identify and determine the percentages of instances of common transitions, in addition to the common modes, during the learning phase. This allows the invention to report on unprecedented transitions, as well as unprecedented states and bad modes, during the monitoring phase.

Predictions.

When extended to include state labeling and transition monitoring, the invention can predict entry of bad modes: when the system state vector enters any mode that has a high probability, as identified by the transition analysis, for transitions that lead directly to a bad mode, or for transition trajectories that lead indirectly to a bad mode, the invention can give an early warning for that bad mode.

Time Data.

Additional precision can be achieved by including time and date data in the state vector. By converting this time stamp to time of day, day of week, day of month, month of year or day of reporting period, the invention can identify if an otherwise common mode of behavior occurs at an uncommon point in time. For example, if a heavy processing load, which might be perfectly reasonable during working hours, were to occur in the middle of the night, this might be an indication of a possible security violation. The time stamp can also be compared with a calendar specific to the enterprise, permitting identification of unusual workloads occurring during local banking holidays or other inactive occasions.

Consolidation of Asynchronous Data.

As defined above, the invention requires that all metrics be available at the same time point, since it requires a complete vector in the n-dimensional space-both during the tutorial and monitoring phases. However, the agents, probes and managers that collect the data may also do so at irregular or uncoordinated time intervals, producing an irregular sequence of incomplete state vectors. To allow the invention to operate with such data collectors, and to consolidate asynchronous data, it can be extended to incorporate a component that completes a state vector using interpolation, simple data lagging or some other technique.

Monitoring of Complex Systems.

This invention does not require that the "monitored system" be a single computer system. The invention processes information that is supplied by the data collection agents, probes or managers, without regard to the identity of the originating system. Thus, the invention can correlate data from other systems including other management systems. It can also monitor an abstract system, composed of hardware and software systems distributed across a network.

Generation of Meaningful Messages.

Once the invention has identified a situation that needs to be reported (the system state vector leaves a common mode, reenters a common mode, or generates a significant prediction) it generates a message. This message can be sent to a standard systems management console or other reporting tool. Generating a meaningful message requires some analysis. A human manager cannot interpret information about the geometry of the common modes in n-dimensional space. A complete dump of the monitored metrics is not useful, since the data volume is too large.

To solve this problem, during the learning phase the invention identifies the significant metrics, those that show significant variation during the learning phase. This allows metrics that do not show significant variation to be excluded from the report.

In addition, the invention can identify correlated metrics, excluding all but one of those metrics that always vary together or inversely. A discriminate analysis procedure is then used to identify the subset of the metrics that are sufficient for separating one common mode from the others. This procedure finds the most efficient subset of the metrics necessary to identify correctly whether a system state is in that particular common mode. This procedure is invoked for each of the common modes, and the superset of all metrics identified represent the most significant set of metrics for identifying the system state.

After such analysis, the report can be limited to only significant, non-covariant metrics. The metrics that differ most from the common modes are shown.

This identification of insignificant and correlated metrics also allows the invention to discard these metrics to reduce the processing cost of the analysis.

To aid in interpreting the report, it is helpful if the geometry of the n-dimensional space is described on a high level. To this end, the invention classifies the situation in one of a few clearly described scenarios: the state vector is just outside a common mode, it is far from any common mode, one value is unprecedented but all other values are within a common mode, etc. The generated report can identify the scenario. In combination with a selective report on the metrics, this constitutes a meaningful report.

The generated message may be sent to, and interpreted by, a human operator or manager as described above. In addition, it may be sent to some other management system where it may be interpreted in various ways, from changing the polling interval of the data collection for systems monitoring, to adjusting some of the operating parameters of the monitored system, to rebooting the monitored system. Management systems for interpreting generated messages in various ways are well known in the industry. The invention communicates with these management systems using conventional technologies.

BRIEF DESCRIPTION OF THE DRAWINGS

FIG. 4 illustrates information flow during the data gathering step of the learning phase: the collection of data by the data collection manager 111 from an agent 101 while the managed system is in typical operation, and storage of such data in the store 111a.

FIG. 5 illustrates a second step of the learning phase: a data collection manager (111) collects real world data and determines a set of state vectors and stores the vectors in a store 111a, and a pattern recognition manager 112 retrieves the state vectors from the store 111a and analyzes the state vector data with pattern recognition techniques to identify common modes of operation within the managed system and stores such common modes in store 112a.

FIG. 6 illustrates data flow during the monitoring phase: a state manager 111 receives state information data on a continual basis from an agent 101 during standard operation of the managed system, and a state determination manager 113 compares such data (vectors) with common modes in the store 112a.

FIG. 9 illustrates data flow during incremental learning, when the state monitoring manager 113 is informed that a state vector received from the data collection manager 111 is to contribute to an additional common mode stored with the model stored in store 112a or 113a.

DETAILED DESCRIPTION OF THE PREFERRED EMBODIMENT

Configuration

In terms of operating configuration, the invention may operate on a dedicated computer, on a computer already dedicated to monitoring or other management functions, or on the monitored system itself.

Architecture

Figure 1:
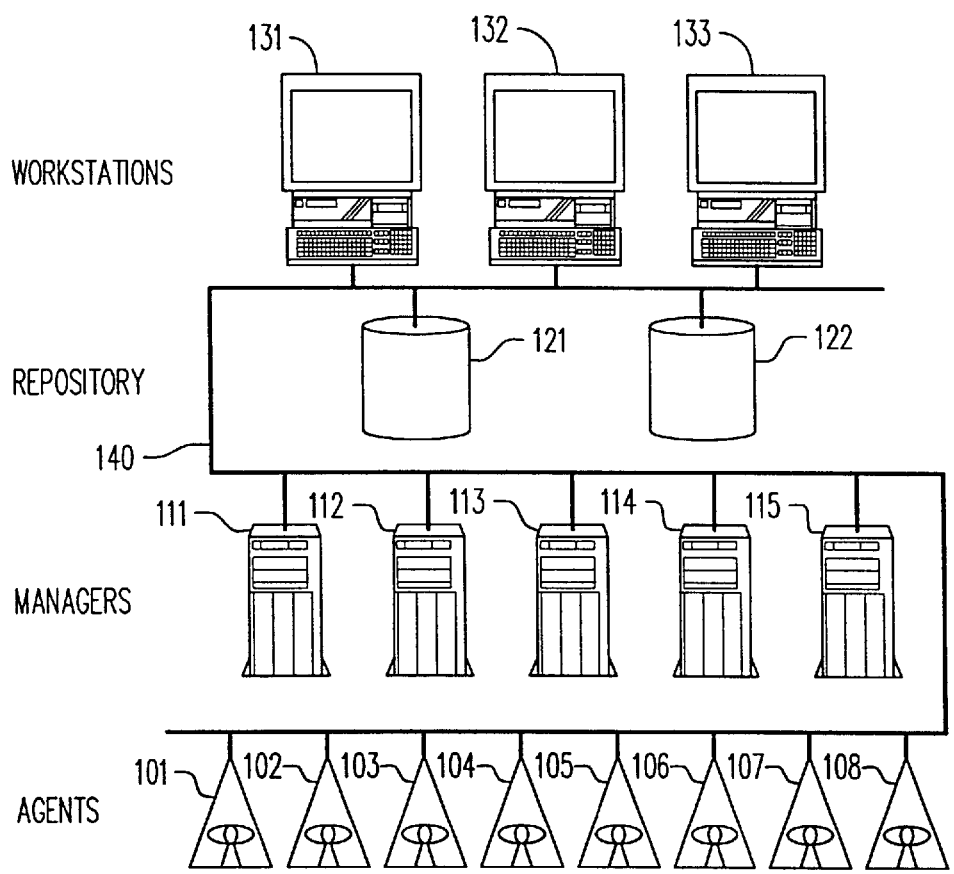
FIG. 1 illustrates a simplified diagram of the general architecture of a network and information system management system, comprising workstations 131–133, repositories 121–122, managers 111–115, and agents 101–108.
Figure 2:
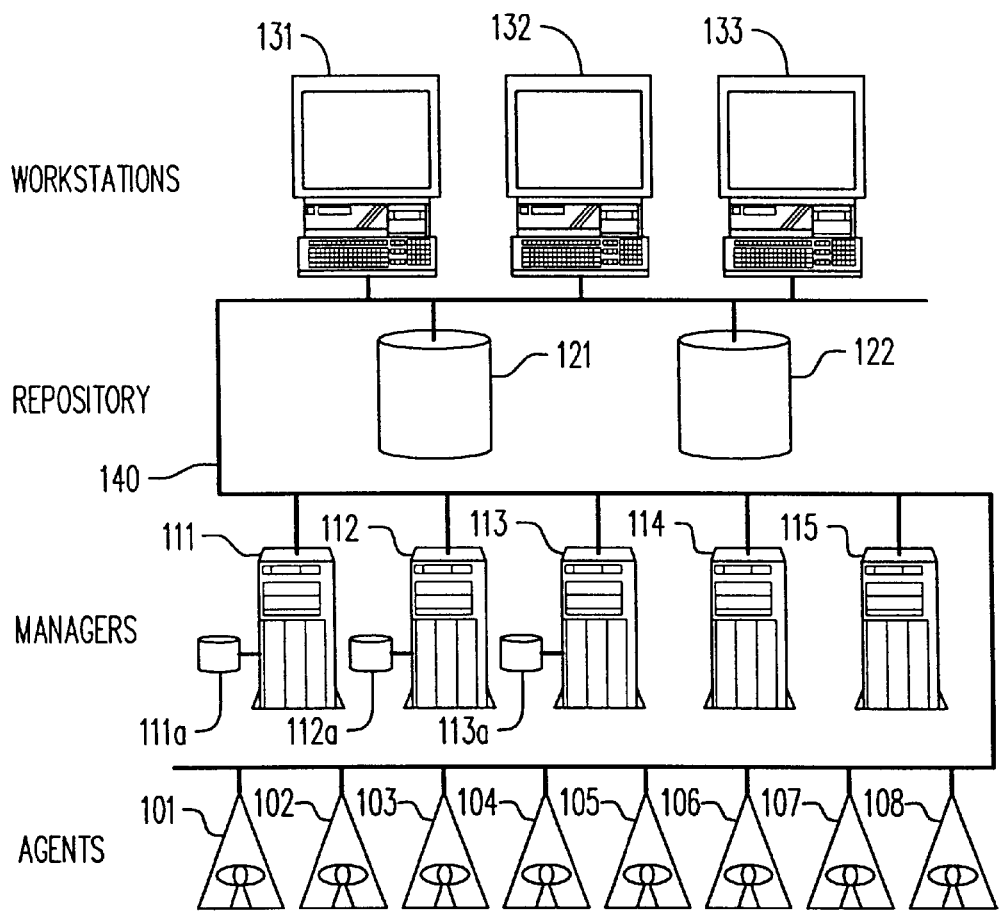
FIG. 2 illustrates information stores 111a, 112a, 113a of the state monitoring managers 111–113.
Figure 3:
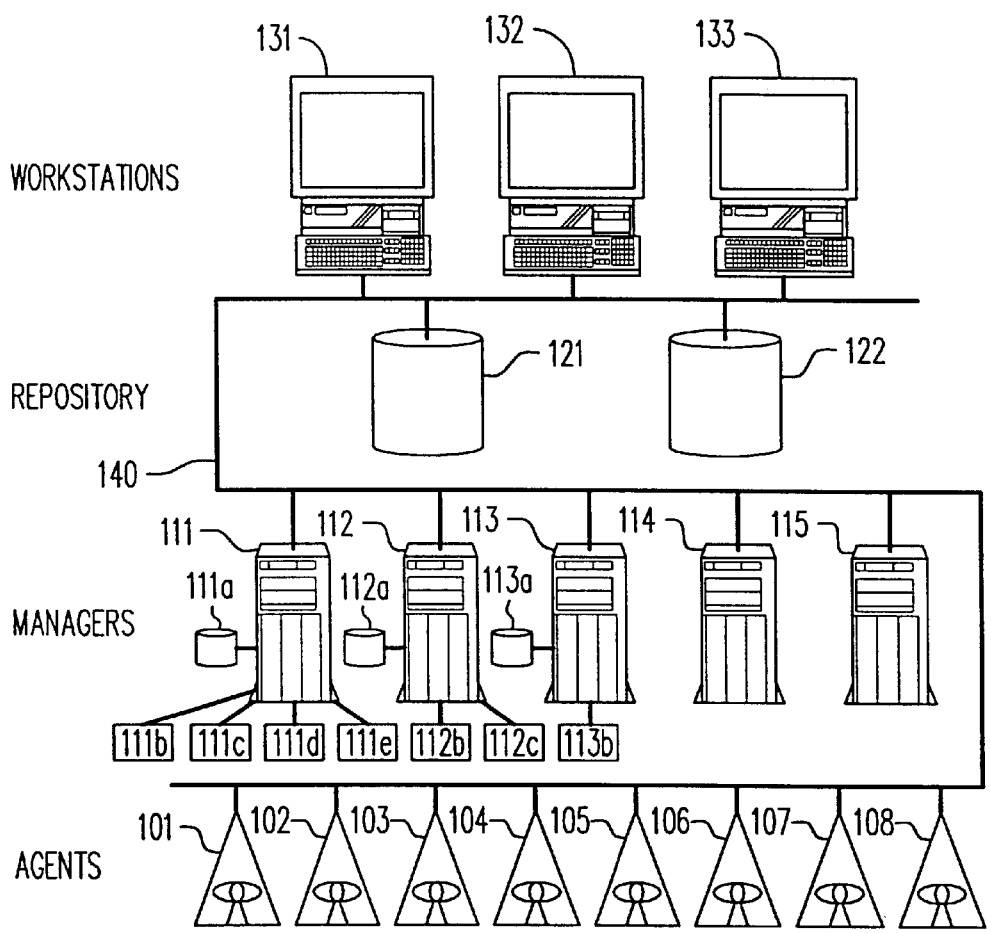
FIG. 3 identifies the function for the several managers in one possible architectural structure: data collection and traffic 111, pattern recognition 112, state determination (monitoring) by pattern recognition 113, state determination (monitoring) by policies 114, and other management 115, and also illustrates additional stores 111b, 111c, 111d and 111e; and 112b and 112c; and 113b of the managers for various optional services.

FIGS. 1–3 show a simplified diagram of the architecture of a network and systems management system. Such systems generally have one or several agents 101–108 which operate on the managed systems and network components and report information on what is going on in the managed systems. (These agents may have other capabilities that are not relevant to this invention.) The system also includes one or several managers 111–115 that do most of the work of managing the systems. These managers may provide many capabilities that are not relevant to this invention, but they also collect information from the agents, determine the status of the managed systems according to some set of rules, and decide when to raise an alarm and propagate that alarm upwards in the system. The system also often contains some form of persistent store or repository 121–122 that stores the information about the managed systems and their status. There may be one or several such stores in the system. The system also includes one or several workstations 131–133 that provide the user interface that makes the information available to human operators and managers.

Thus, in a typical complex system, the information flow in monitoring systems and network components goes from the agents that collect the data, to a manager that makes decisions about status and alarms, to the repository that stores the information and to the user interface that presents it.

Any one of these components may be missing in simpler systems: for example, if the agent is smart enough to make decisions and raise alarms, no manager may be needed; some systems may not store information persistently, so the repository may be missing; and in some cases, automated management systems may take action on an alarm condition on their own, so the user interface is not included. Such variations are not pertinent to the present invention.

The placement of these functions on computer or network systems may be arranged in different ways. All the components may be placed on separate systems, or some may be integrated on a single system. Such arrangement variations have practical implications on how the components communicate, and they have important implications on the performance and reliability characteristics of the system, but they are not relevant to the present invention.

The technical means of communication between the components may also vary. Agents often communicate through the industry-standard SNMP (Simple Network Management Protocol), but other systems may be used: proprietary systems of different forms, or standard systems like Java RMI (Remote Method Invocation) or Microsoft DCOM (Distributed Common Object Model). Again, these different techniques are not relevant to the present invention.

In the present invention, the activity proceeds as follows:

Agents 101–108 collect information from the managed network, hardware and software systems, and report that data through SNMP or other protocols. The agents may report their data synchronously, in response to poll requests from the management system, or asynchronously, as events that they fire off on their own volition.

A manager 111 is in charge of this information traffic: it polls the agents as required, it receives the data coming back in response to polls or as independent events, and it does any post-processing of the messages that may be required, for example to translate data formats or compare a value with a previous value to derive a differential value.

The manager has a persistent store 111a for holding the long-term data that is used during the learning phase. This store may be a database management system, or simple files.

The pattern recognition processing is done by a manager 112, which retrieves information from the persistent store 111a, and performs the pattern recognition as described below.

The pattern recognition manager 112 also has a persistent store 112a for holding the model (common modes) that is generated by the invention during the learning phase. Again, this store may be a database management system, or simple files.

The monitoring of the managed system, comparing it with the model generated in the learning phase, is done by a manager 113. It uses information retrieved from the managed systems by agents 101–108 by the data gathering manager 111, compares it with the model stored by the pattern recognition system 112 in the persistent store 112a, and issues messages using standard messaging services provided by the infrastructure 140.

Figure 7:
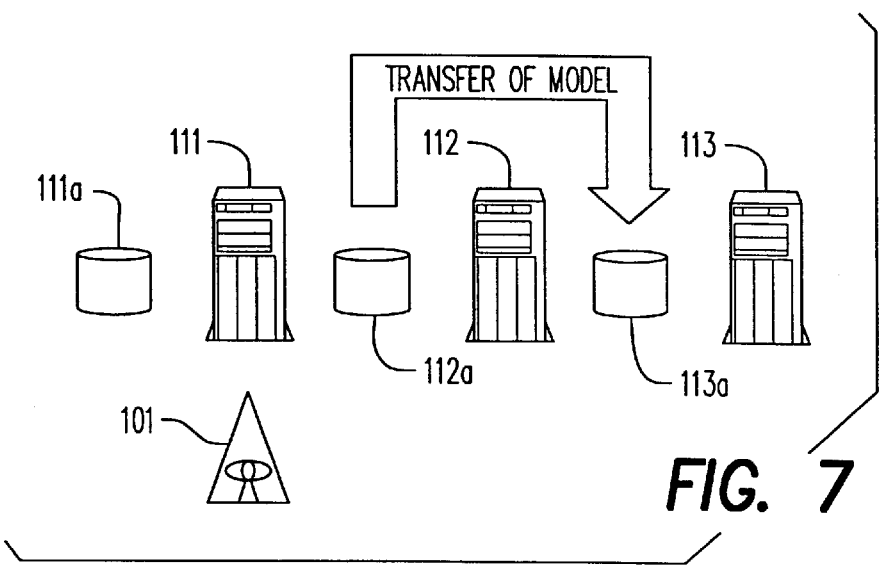
FIG. 7 illustrates data flow during deployment of the invention, when the model (set of common modes) is transferred from the store 112a of the pattern recognition system 112 to the store 113a of the monitoring system 113 on a different computer system.
Figure 8:
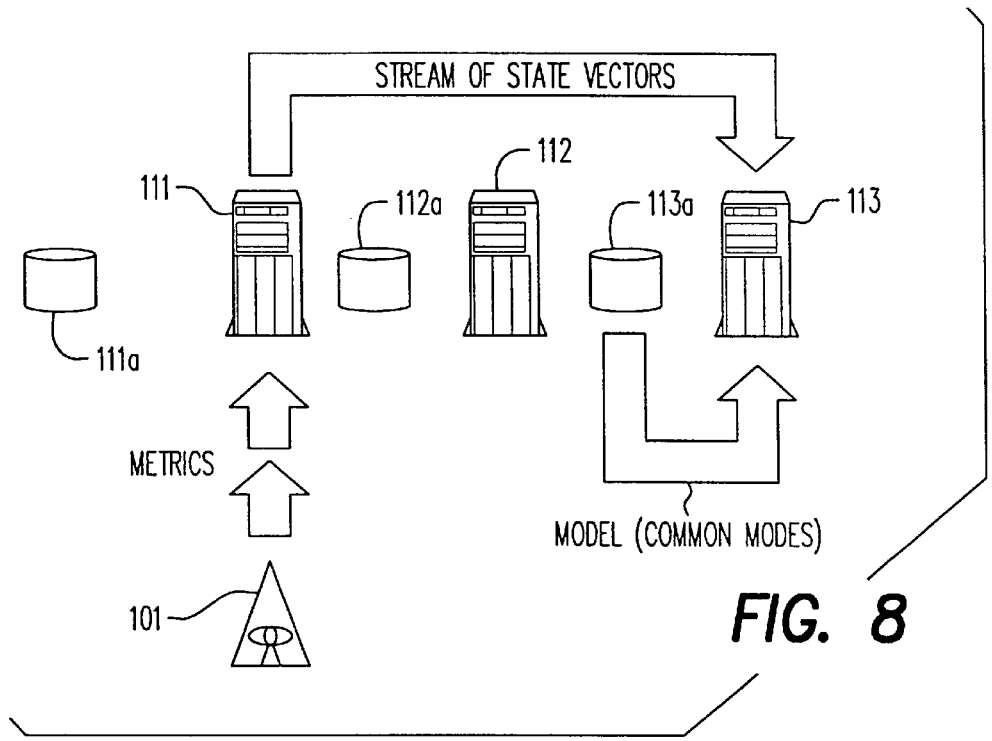
FIG. 8 illustrates data flow during the monitoring phase when the model is stored in the store 113a with the monitoring system 113 on a computer separate from the pattern recognition system 112.

In terms of physical configuration, the various components of the invention may be placed on different physical computer systems or all on the same system, as is preferred for operational reasons. Some of these configuration options have architectural implications, however. It should be noted that the learning phase is more expensive than the monitoring phase, in terms of processing time and resources. Because of this difference in processing requirements, it may be desirable to place the pattern recognition manager 112 and the monitoring manager 113 on different systems with different capabilities. In particular, it may be desirable to place the monitoring manager 113 on the very computer system that is being monitored, together with the agent 101. In this case, the monitoring manager 113 should have its own store 113a for keeping the model, as in FIG. 8, since it may not always have access to the store 112a that originally held the model. In this case, the learning phase must include as a last step the deployment of the model from the store 112a to the store 113a, as in FIG. 7.

Optionally, the invention includes a topology analysis component 113b for categorizing the situation in one of a number of standard cases, thereby making the generated messages more intelligible to a human.

Other components of the management system may include a classical, policy-based state determination system 114. This technology, which is well known, is not directly relevant to the present invention. However, it should be noted that policy-based state management and state management based on pattern recognition may coexist in one management system, where the status of any managed system may be reported by either component, or possibly both in combination: either the pattern-based manager 113 or the policy-based manager 114 may determine that a managed system is in a troubled state and raise an alarm to that effect.

The system includes a connection between the traffic manager for data collection 111 and the neural network manager 113, so that the traffic manager can pass newly reported states to the neural network for analysis.

The system also includes a connection between the state management complex 111–114 and the various consumers of the information determined by the state managers; other management tools 115 for automated response or disposition, repositories 121–122 that store this information persistently, or workstations 131–133 that present the information to human operators using a conventional management console or other user interface.

The monitoring manager 113 includes a facility for generating the appropriate message that is sent to the consumers. This message contains the relevant information that allows the consumers to identify the situation, it is constructed in the appropriate format and protocol required by the environment; these formats and protocols may be industry-standard, like SNMP, or proprietary.

Other embodiments of the present invention may include one or more of the following features:

(a) a store 111b for maintaining a short history of data points, for the purpose of reconstructing a complete state vector when incomplete data is collected;

(b) a facility 111c for creating a current time stamp, if one is not included with the collected data;

(c) a facility 111d for converting the time stamp to time metrics that make sense from the viewpoint of the enterprise, such as time of day, day of week, day of month, month of year; and (d) a facility 111e for converting the time stamp to business-related metrics, such as day of reporting period, reporting period in fiscal year, working day or holiday, day before holiday.

In FIG. 3, the optional facilities 111b, 111c, 111d and 111e are shown connected to the traffic manager 111. This is a convenient arrangement, but is not necessary: in other embodiments they could be connected directly to the neural pattern recognition manager 112, or to the network as independent components.

The invention operates in two distinctly separate phases: the learning phase, and the monitoring phase.

Figure 4:
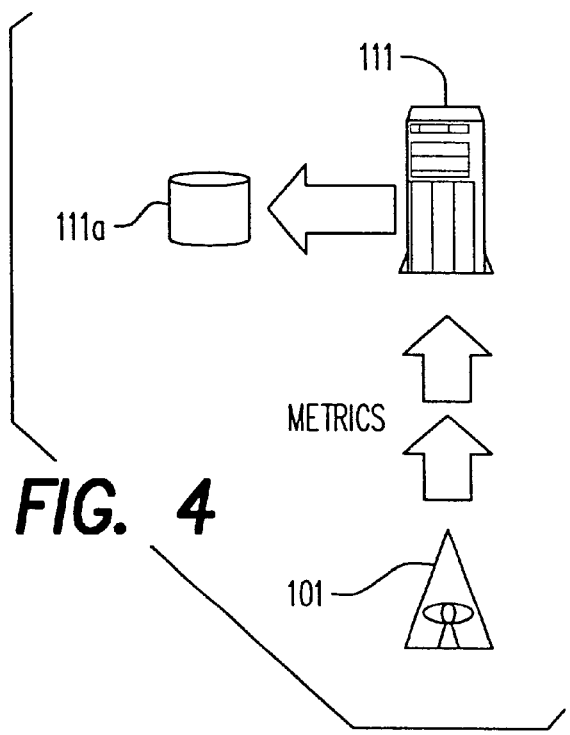

In the learning phase, the system goes through two steps. First, as in FIG. 4, the data gathering management system 111 collects data from the agents 101–108 during a typical workload of the managed system, and stores it in the persistent store 111a.

Figure 5:
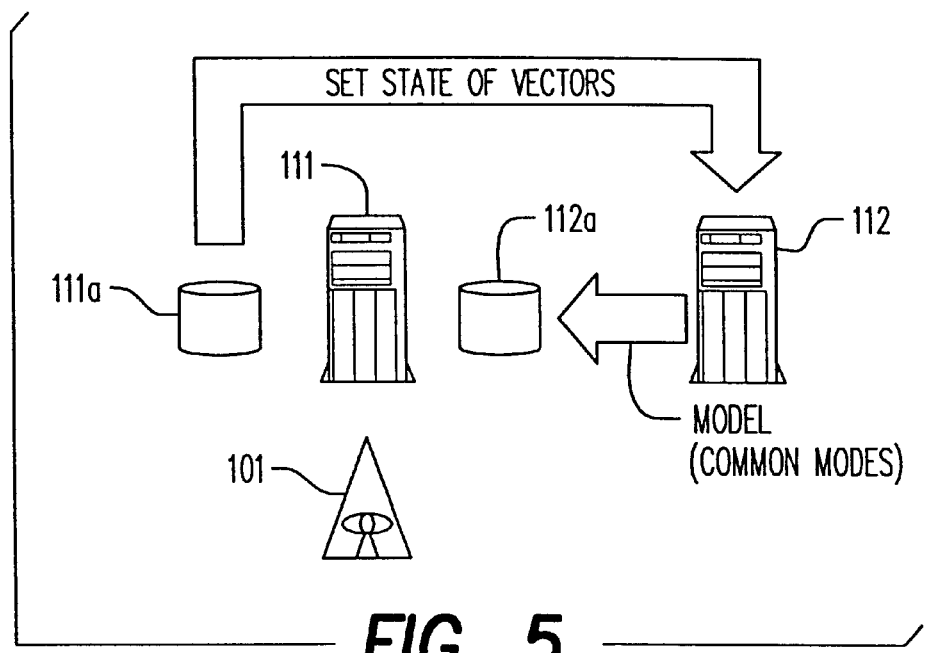

When sufficient data has been collected, the pattern recognition manager 112 enters step two of the learning phase, illustrated in FIG. 5, when it analyzes this data with pattern recognition techniques to find "common modes" of the system operation. A common mode is a region in the n-dimensional space in which the state vectors appear that represents a cluster of commonly occurring state vectors. The pattern recognition manager stores the model it generated, representing the common modes, in its persistent store 112a.

Figure 6:
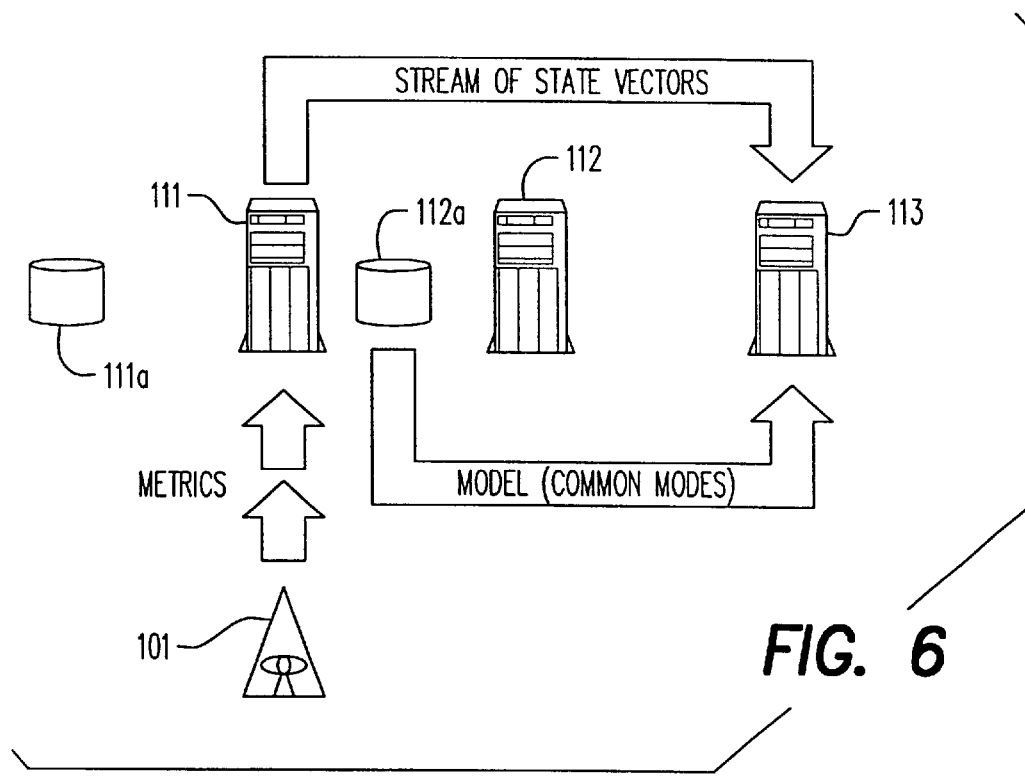

The system then enters the monitoring phase, illustrated in FIG. 6, when the monitoring manager 113 receives state information from the agents 101–108 on a continual basis, collected through the services of the data collection manager 113, and compares these state vectors with the common modes than make up the model stored in 112a.

Figure 10:
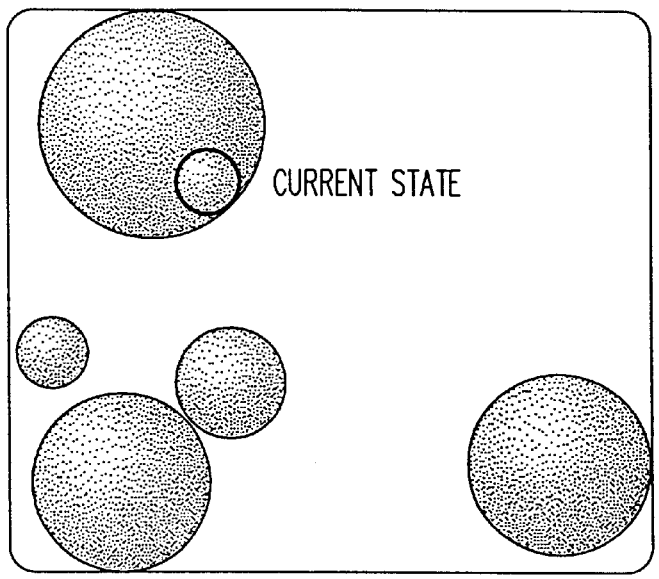
FIG. 10 illustrates system state within a common mode.
Figure 11:
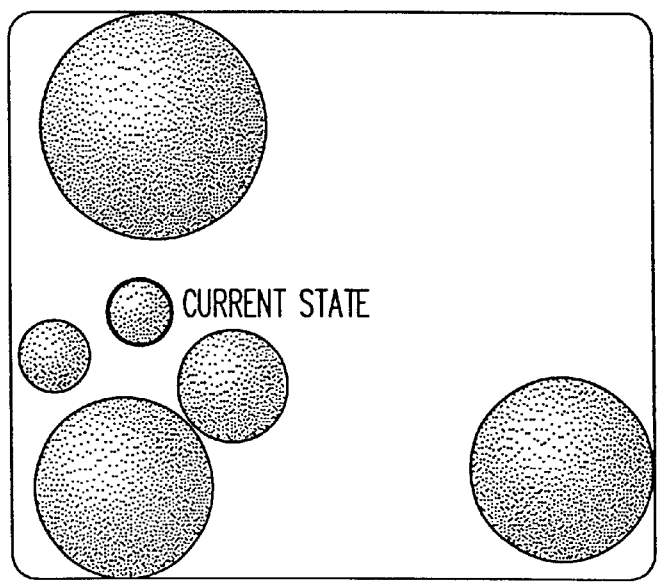
FIG. 11 illustrates system state outside of common modes.

When the state vector lies within a common mode as in FIG. 10, the monitoring manager recognizes this as a common situation that does not warrant an alarm. But if the state vector lies outside the common modes, as illustrated in FIG. 11, the monitoring manager recognizes an uncommon or unprecedented situation and raises an alarm.

The monitoring manager 113 constructs a message and sends it out using the standard messaging services provided by the infrastructure 140. This message includes the data defining the current state, and the boundaries of the nearest common mode.

In addition, to aid in the interpretation of the alarm, the monitoring manager 113 may also categorize the topology of the situation in the n-dimensional state space into one of several predefined cases use a topological analysis component 113b.

The identified cases may include, for example:

the state is just on the boundary of a common mode;

the state contains a few metrics with unprecedented values, but is within the overall bounds of the historical data;

the state contains many metrics with unprecedented values, but is within the overall bounds of the historical data;

all metrics individually have familiar values but the combination of values is unprecedented, although still within the overall bounds of the historical data;

the state is far from any common mode, although still within the bounds of the historical data;

the state is outside the bounds of the historical data but near a common mode; or the state is outside the bounds of the historical data and far from any common mode.

In addition, the pattern recognition manager 112 may identify redundant, strongly correlated, or combinations of metrics during an initial step of the learning phase. It then stores this information with the model in the persistent store 112a. It can then use this information to eliminate redundant data, reduce the amount of processing required for the pattern recognition.

The monitoring manager 113 can also use this information to eliminate redundant data from the report, which helps in making the report more easily read and interpreted.

In addition, the identification of most significant discriminant metrics, produced by the discriminate analysis done by the pattern recognition manager 112 during the learning phase, is used by the monitoring manager 113 to further refine the message and make it more easily read and interpreted.

Implementation of State Labeling

As described above, the invention can determine when the system state vector enters an unprecedented state, outside of any common mode identified during the learning phase. The pattern recognition manager 112 can also include a manual state labeling component 112b or an automatic state labeling component 112c that associate the state labels with the identified common modes as good, bad or with some other classification. These labels are stored with the common modes that constitute the model in the persistent store 112a.

The manual state labeling component 112b accepts labels provided by a human and attached to a state vector. The state labels may have been provided through an interactive user interface component in the workstation 131, or collected through some other data entry process. The technology used for the user interface is not relevant to the present invention.

The association with the state vector may be indirect, in that the label is associated with a point in time; in that case, the data collection manager 111 uses the same component 111b that it uses to consolidate asynchronous metrics into state vectors.

The automatic state labeling component 112c derives the state label indirectly, by comparing the monitored metrics from the agents 101–108 with manually set thresholds or correlation rules, by similarly analyzing metrics or event provided by other management systems, or by reviewing information in help desk systems or other information sources. Thus, the automatic state labeling component 112c may be tailored to a specific environment, provided with rules of arbitrary structure and complexity. Such rule-based systems are well known in the industry, and constructing or incorporating such a system is a task well understood by experienced practitioners skilled in the art. The details of how the automatic state labeling is done are not relevant to the present invention.

With either manual or automatic state labeling, the pattern recognition system 112 uses the state labels to label the identified common modes, using simple averaging or worst-case association, or optionally some more complex analysis.

Once the common modes in the persistent store 112a have been labeled, the monitoring manager 113 generates a message when a state vector enters a state labeled as bad, or with some other label worthy of generating a message. Each label has a human-readable text description, as well as a severity code that tells the message generation whether a message should be generated.

The pattern recognition manager 112 can analyze the identified common modes to determine probability patterns for mode transitions and long mode transition trajectories. It does this by applying the same type of pattern recognition to the historic trail of entry of the identified modes. The identified patterns of transitions, including the statistics of transition likelihoods, are stored with the model in the persistent store 112a.

The monitoring manager 113 can now use the transition pattern model to generate two types of messages. It can detect when an unprecedented transition is made, and issue a warning message about this, the same way it generates a message about unprecedented states. In combination with state labeling, it can also generate an early warning when the system enters a mode from which the likelihood for a transition, direct or indirect, to a state labeled as bad is above some predefined threshold.

Implementation of Incremental Learning

During monitoring of a system the invention may come across an unprecedented state, one that did not occur during the learning phase, but one that is nonetheless a "normal," non-problematic state. For example, the learning phase may have been based on data from the first month of the quarter, and the end-of-the-quarter processing appears strange to the monitoring manager 113 since it does not match any of the modes in the model.

Figure 9:
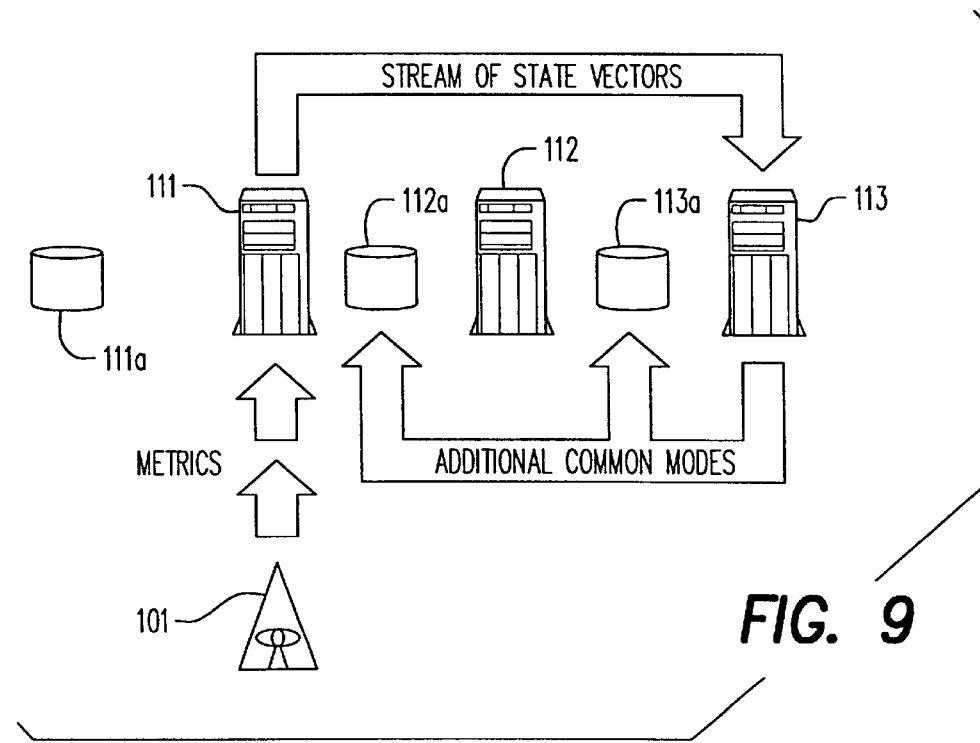

The warning message that the invention issues is therefore a false alarm, and the human manager who responds to the message may indicate this, essentially telling the invention that this a common mode, labeled "good." Of course, it is always possible to run through the learning phase again with the more complete set of data, including the end-of-the-quarter situations, but this may not always be attractive. In particular, in configurations where the monitoring manager 113 is separate from the pattern recognition manager 112, it would be preferable if the new modes that would be derived from the new states could be incrementally added to the model in the store 113a, as in FIG. 9. Depending on the pattern recognition technology used in 112, the invention may support such incremental learning directly into the model store 112a or 113a. After a long period with a lot of such incremental learning, it may be preferable to consolidate the model by rerunning the learning phase on the complete set of data.

The foregoing inventive system and apparatus has been described generally and with reference to preferred and other embodiments. Those skilled in the art, upon reading of the specification, will understand that there are equivalent alterations, modifications and embodiments including systems that monitor the state of systems that may not be labeled "networked computer systems" but which substantively are networked computer systems. The present invention includes systems to monitor the state all networked computer systems, and various hardware or software components thereof, however labeled, and includes all such equivalent alterations, modifications and embodiments.

We claim:

1. A system to determine and predict the state of at least one component in a networked computer system, comprising:
    a learning subsystem comprising components for a first step of collecting of data from an agent during typical operation of such information system and storing such data, and for a second step of analyzing such stored data by pattern recognition techniques to identify common modes of operation of such system or components thereof, and storing such common modes;
    a state-labeling subsystem comprising components enabling a human manager to label selected vectors at selected points as good or bad; and
    a monitoring subsystem comprising components for receiving data from data collection agents of state information on such information system or any component thereof, for comparing such data to such stored common modes, and for reporting when such information system or any such component thereof is in an unprecedented state.

2. The system of claim 1 further comprising a subsystem for identifying common transitions between modes and determining the percentages of instances of and probabilities of common transition between modes as part of the learning subsystem.

3. The system of claim 2 further comprising:

a system to determine when a system state vector enters a mode that has high probability for a direct or indirect transition to a state labeled as bad in order to predict and give an early warning of entry of such a state.

4. The system of claim 3 further comprising a system to monitor transitions between common modes, in order to report on unprecedented transitions between the common modes.

5. The system of claim 1 further comprising an additional subsystem for including general time and date data in the state vector in order to identify an otherwise common mode occurring at an uncommon point in time.

6. The system of claim 5 wherein said additional subsystem utilizes customized time and date data rather than general time and date data in identifying state patterns.

7. The system of claim 1 further comprising a component for consolidating asynchronous data in both said learning and monitoring subsystems.

8. The system of claim 1 further comprising a system to cooperate with other systems including other information management systems.

9. The system of claim 1 further comprising a subsystem comprising components for determining significant metrics for the purpose of reducing the processing cost of the analysis by discarding insignificant metrics.

10. The system of claim 1 further comprising a subsystem comprising components for identifying and discarding redundant metrics for the purpose of producing meaningful reporting.

11. The system of claim 1 further comprising a subsystem comprising components for identifying standard situations with regard to the location of the current state relative to the identified common patterns for the purpose of producing meaningful reporting.

12. A method for determining and predicting the state of at least one network component in a networked computer system, comprising:

collecting data from an agent during typical operation of the networked computer system;

storing the data;

analyzing the data using pattern recognition techniques to identify common modes of operation of the networked computer system or network component;

storing common mode data representing the common modes of operation;

receiving from a human operator a state label associated with at least one of the common modes of operation, thereby identifying the at least one common mode of operation as good or bad;

receiving state data from the agent during monitored operation of the networked computer system;

comparing the state data to the common mode data; and reporting when the networked computer system or network component is in an unprecedented state.

13. The method of claim 12, further comprising:

correlating at least one common mode of operation with events or metrics reported by management tools, thereby identifying the at least one common mode of operation as good or bad.

14. The method of claim 12, further comprising:

identifying common transitions between common modes of operation; and determining likelihoods of common transitions.

15. The method of claim 14, further comprising:

determining when the networked computer system or network component is operating in a common transition having a high likelihood of transitioning to a common mode of operation identified as bad, thereby enabling an early warning of such a state.

16. The method of claim 14, further comprising:

monitoring transitions between common modes of operation;

identifying an unprecedented transition between the common modes of operation.

17. The method of claim 12, wherein the common mode data includes general time and date data in order to identify an otherwise common mode occurring at an uncommon point in time.

18. The method of claim 12, wherein the common mode data includes customized time and date data to enable identification of state patterns.

19. The method of claim 12, wherein the steps of collecting data and receiving state data include consolidating asynchronous data.

20. The method of claim 12, further comprising cooperating with other systems including other information management systems.

21. The method of claim 12, further comprising:

identifying the most significant set of metrics for the system state; and selectively classifying each state vector in relation to a common mode, in order to generate a meaningful report.

22. The method of claim 12, further comprising:

determining significant metrics, thereby reducing the processing cost of the analysis by discarding insignificant metrics.

23. The method of claim 12, further comprising:

identifying and discarding redundant metrics, thereby producing meaningful reporting.

24. The method of claim 12, further comprising identifying standard situations with regard to the location of the current state relative to the identified common patterns, thereby producing meaningful reporting.

25. The method of claim 12, further comprising specifying the degree of goodness or badness of common modes.

* * * * *